Oct. 27, 1931.  M. H. SHOENBERG ET AL  1,829,194
CIRCUIT CONTROLLING DEVICE
Filed Feb. 8, 1927   3 Sheets-Sheet 1
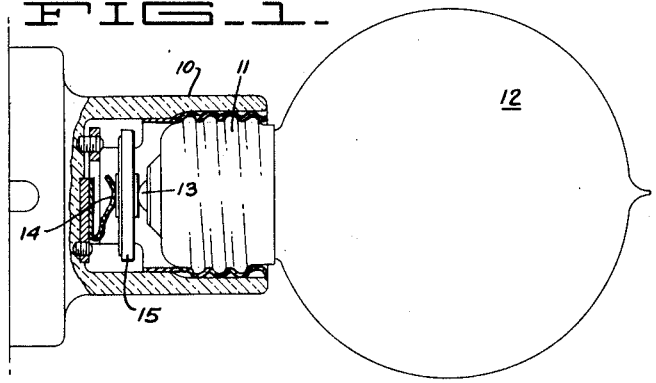
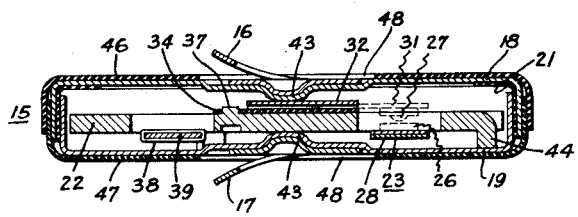
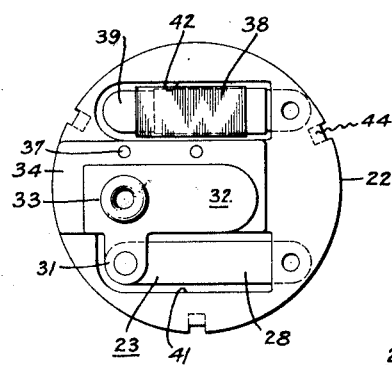 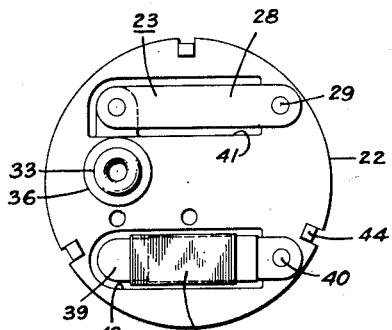
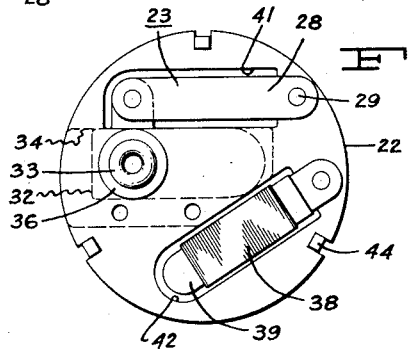
INVENTORS
Milton H. Shoenberg
Lester Schon
BY
White, Prost & Fryer
their ATTORNEYS Oct. 27, 1931.    M. H. SHOENBERG ET AL    1,829,194
CIRCUIT CONTROLLING DEVICE
Filed Feb. 8, 1927    3 Sheets-Sheet 2
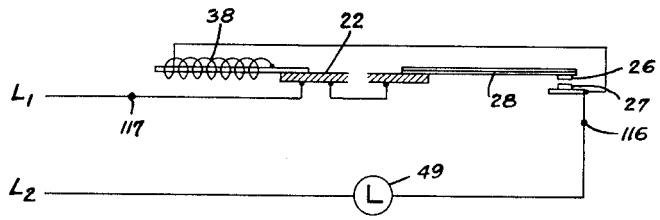
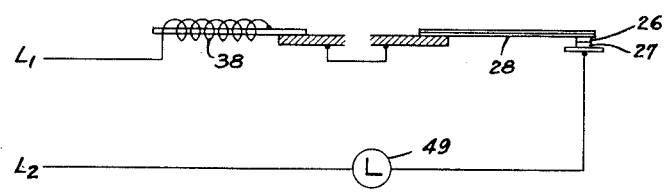
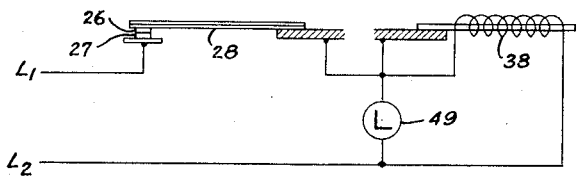
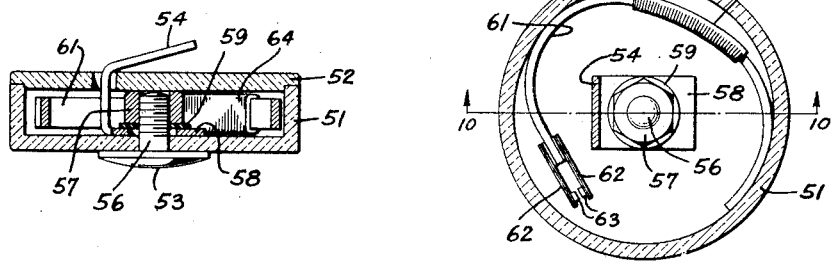
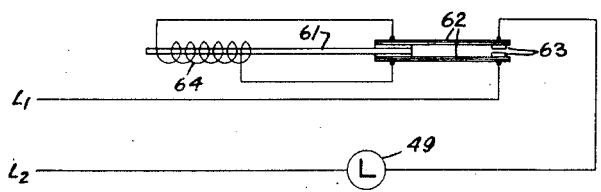
INVENTORS
Milton H. Shoenberg
Lester Schon
BY
White, Frost & Fryer
their ATTORNEYS Oct. 27, 1931.  M. H. SHOENBERG ET AL  1,829,194
CIRCUIT CONTROLLING DEVICE
Filed Feb. 8, 1927   3 Sheets-Sheet 3
FIG.12.   FIG.13.
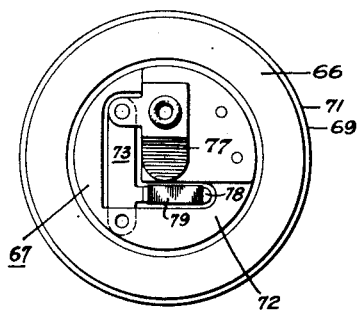
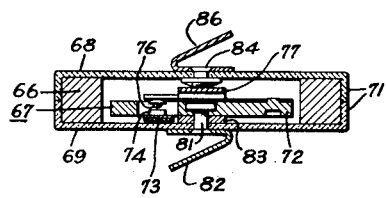
FIG.14.
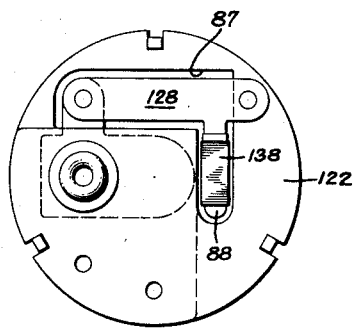
INVENTORS
Milton H. Shoenberg
BY    Lester Schon
White, Prost & Fryer
their ATTORNEYS Patented Oct. 27, 1931

1,829,194

UNITED STATES PATENT OFFICE

MILTON H. SHOENBERG AND LESTER SCHON, OF SAN FRANCISCO, CALIFORNIA; SAID SCHON ASSIGNOR TO SAID SHOENBERG

CIRCUIT CONTROLLING DEVICE

Application filed February 8, 1927. Serial No. 166,661.

This invention relates generally to devices for controlling electrical circuits, and has special application to controlling devices for effecting a timed variation of current.

Circuit controllers of the thermostatic type have been commonly used in signalling, display and advertising devices for flashing electrical lamps. Such controlling devices are generally known as circuit interrupters and are constructed of a pair of relatively movable contacts controlled by a bi-metallic element. Eletrically associated with the contacts there is a heating resistance which usually comprises a fine resistance wire which is wound directly upon the bi-metallic element. When a circuit interrupter is constructed in this manner it is practically impossible to reduce the timing rate below a certain value, especially when the interrupter element is mounted within a button shaped casing as it is proposed as one feature of this invention. For certain purposes a slow operating circuit interrupter is desirable, as for certain types of display devices or for timing the operation of other electrical circuits.

It is an object of this invention to devise a thermostatic circuit controller in which the timing may be made relatively slow compared to ordinary types of thermostatic controllers.

It is a further object of this invention to devise a slow timed circuit controller in the form of a button shaped device which may be removably inserted in a lamp socket or receptacle.

Further objects of this invention will appear from the following description in which we have set forth the preferred embodiment of our invention. It is to be understood that the appended claims are to be accorded a range of equivalents consistent with the state of the prior art.

Referring to the drawings:

Fig. 1 is a side elevational view partly in cross section illustrating a device incorporating the circuit controller of this invention.

Fig. 2 is a transverse cross sectional view of the device shown in Fig. 1.

Fig. 3 is a detail of the circuit controller of this invention and which is applicable to the device shown in Figs. 1 and 2.

Fig. 4 is a bottom plan view of the circuit controller shown in Fig. 3.

Fig. 5 is a bottom plan view similar to Fig. 4 but showing a modification of the controller.

Figs. 6, 7 and 8 are circuit diagrams illustrating the different ways in which the device of this invention may be electrically connected with these circuits.

Fig. 9 is a cross sectional view of a modified form of circuit controller incorporating the principles of this invention, the controller being disposed within the modified form of casing.

Fig. 10 is a cross sectional view taken along the line 10—10 of Fig. 9.

Fig. 11 is a circuit diagram illustrating one way in which the circuit controller shown in Figs. 9 and 10 may be electrically connected to a lamp.

Fig. 12 is a plan view of a modified form of the invention, with a portion of the device removed for exposing the thermostatic element.

Fig. 13 is a transverse cross sectional view of the device as shown in Fig. 12.

Fig. 14 is a plan view of the metallic mounting for the resistance element employed in the device shown in Figs. 12 and 13.

The invention comprises generally a thermostatic circuit controller in which a heat conducting path is interposed between the resistance element and the heat responsive element. The resistance wire is wound upon a separate member and both this member and the heat responsive element are secured to a common heat conducting mounting. As the time required for the heat from the resistance to flow into the heat responsive element determines the timing of the device, the timing may be made any value desired by changing the length and character of the heat conducting path. In the preferred embodiment of the invention the circuit controller is incorporated in a relatively flat or button shaped device which may be removably inserted in a lamp socket or receptacle to effect a timed variation of current supplied by the socket to an electric lamp or other connection device. Thus in Fig. 1 of the drawing there is shown a lamp receptacle 10 within which is inserted the base 11 of an electric lamp 12. Interposed between the central contact terminal 13 of the lamp base and the contact 14 of the receptacle, there is a circuit controlling device 15 incorporating certain principles of this invention. This device has contact terminals 16 and 17 disposed upon opposite faces for making electrical connection with contacts 13 and 14 of the lamp base and socket respectively. A circuit controlling device of this kind is disclosed in the patent of Milton H. Shoenberg No. 1,400,914.

The structural details of the circuit controlling device 15, which are shown in Figs. 2 to 5 inclusive, incorporate certain features disclosed in the patent application of Shoenberg and Schon No. 101,675 filed April 13, 1926. Thus the body of the device consists of a metal casing having two cup shaped sections 18 and 19 which engage in interfitting or telescoping relationship. These metal sections are utilized for conducting current from the contacts 16 and 17 to the circuit controller and are therefore insulated from each other as by means of a ring 21 of insulating material. Within the casing there is disposed a relatively flat metallic member 22 which serves as a mounting for the thermostatic circuit controller indicated generally at 23.

One form of circuit controller giving good results, and which is similar to the controller described in the Shoenberg and Schon application to which reference has been made, comprises relatively movable and stationary contacts 26 and 27 respectively, the movable contact being controlled by and mounted upon one end of a bi-metallic strip 28. The other end of this bi-metallic strip is secured to the member 22 as by means of an integral upset projection 29. The other contact 27 is mounted upon a conductor strip 31 which extends from the spring contact strip 32. Spring strip 32 is mounted upon the opposite face of member 22 as by means of an eyelet 33. A sheet 34 and washer 36 of insulating material, such as mica, serve to insulate the strip 32 and eyelet 33 from direct electrical contact with the member 22. Struck out projections 37 upon member 22 extend through apertures in insulating sheet 34 and aid in positioning this sheet when assembling the device.

The heating resistance for the controller preferably comprises a winding 38 of insulated resistance wire which is applied to a separate metallic strip 39. One end of this strip is clamped in thermal contact with the mounting member 22 as by means of an integral upset projection 40. The manner in which the terminals of this resistance are connected depends upon the circuit arrangement of the controller, although one terminal is generally grounded to the strip 39 and member 22. To provide space within which the bi-metallic element 28 may operate, member 22 is cut away to provide an elongated recess 41. A similar recess 42 is provided for positioning the strip 39 and resistance wire 38.

When the circuit controller and its associated mounting are positioned with the casing, one casing section, namely section 19, is adapted to make electrical contact with the member 22, while the other casing section 18 makes electrical contact with the spring contact strip 32. For this purpose the two casing sections are provided with indentations or struck in portions 43. Integral peripherial projections 44 upon member 22 also serve to center this member within the casing thus preventing short circuiting of any of the controller with the inner walls of the casing. The outer surface of the casing is preferably covered by suitable insulating material in order to prevent short circuiting against the sleeve of the lamp socket or receptacle. Thus we have shown an insulating cover consisting of two sections 46 and 47 having interfitting edges and being cut away or apertured as at 48 to expose contacts 16 and 17.

The connections employed for the controller depend largely upon the type of lamp circuit in which it is intended to be used. For example in the circuit diagram of Fig. 6 there is shown what is commonly known as a shunt connection in which contacts 26 and 27 and light 49 are connected in series, and the resistance 38 is in shunt with the contacts. Terminals 116 and 117 correspond generally to the contact terminals 16 and 17. With this arrangement when the circuit is established through lines $L_1$ and $L_2$, the contacts 26 and 27 are separated and the current flows through resistance 38, which is then connected in series with the lamp or load 49. Heat from this resistance is conducted through member 22 and finally reaches the bi-metallic strip 28. When this strip 28 has been heated sufficiently it flexes to close contacts 26 and 27, thus applying full voltage to lamp 49 and shunting or short circuiting the resistance 38, which then cools to permit contacts 26 and 27 to open.

In Fig. 7 the resistance 38 has been shown as connected in series with contacts 26 and 27 which are normally closed. In this case when the circuit is established, current first flows through the resistance and contacts in series to light the lamp 49. Heat from resistance 38 however finally reaches the bi-metallic element 28 with the result that this element is flexed to separate contacts 26 and 27 to interrupt flow of current through the lamp and resistance 38. After the resistance 38 has cooled, element 28 also becomes cooled sufficiently to again close the contacts. In Fig. 8 there is shown a novel form of circuit arrangement which has been described and explained in our Patent No. 1,789,640, granted January 20, 1931.

In this case three terminals must be provided upon the exterior of the casing as described in said last mentioned application. Contacts 26 and 27 are connected in series with the lines $L_1$ and $L_2$ and the lamp 49, but the resistance 38 is connected in shunt with lamp 49. The contacts are normally closed when the circuit is established, lamp 49 is initially burned to full illumination and the full potential drop across the lines is imposed upon resistance 38. When the heat from this resistance has flowed through member 22 to raise the temperature of bi-metallic element 28, contacts 26 and 27 are opened to interrupt flow of current from the line into both lamp 49 and resistance 38.

In practice circuit controllers of this type may be manufactured to provide any timing desired merely by varying the length and character of the conducting path between the heating resistance and the bi-metallic element. For example in order to shorten the period of interruptions, the strip 39 may be mounted in closer proximity to bi-metallic strip 28 as shown in modification of Fig. 5. Thus in a button in which the strip 39 is mounted in close proximity to the end of bi-metallic strip 28, the period may be relatively short, say one current variation every few seconds, while when the strip 39 is mounted in more remote position the period may be as slow as one current variation every minute.

In Figs. 9 and 10 there is shown a novel form of mounting for a circuit controller. In this case the casing consists of a relatively flat cup shaped member 51 preferably of insulating material which is provided with a cover 52 upon its open face. The terminal contacts 53 and 54 are disposed upon opposite faces and are preferably both mounted upon the insulating cup 51. For example contact 53 is shown as provided with a projection 56 upon which is threaded the nut 57. Contact 54 has an inner integral portion 58 which is clamped against the bottom of the cup by means of nut 57. Short circuiting of the contacts is prevented by means of an insulating washer 59. The circuit controller in this instance consists of an elongated conducting member 61 upon one end of which is mounted the bi-metallic strips 62 which carry the relatively movable contacts 63. At some point along the heat conducting member 61 removed from the bi-metallic elements 62, there is wound a heating resistance 64. Bi-metallic elements 62 are insulated from the conducting member 61 but are in thermal contact therewith so that heat from resistance 64 may flow into and increase their temperature. In Fig. 11 we have shown such a controller connected in the form of a shunt interrupter. In this case the resistance 64 is connected in shunt or parallel with contacts 63 and when the circuit is established through lines $L_1$ and $L_2$, contacts 63 are normally opened and current flows through resistance 64. When the bi-metallic elements 62 have been heated sufficiently by flow of heat through member 61, they are both flexed inwardly to close contacts 63, thus applying full potential to the light 49 and shunting out the resistance 64. The timing of such a circuit controller depends upon the character of the heat conducting member 61 and upon the position of the heating resistance 64. By making member 61 of larger cross section or of material having greater heat conductivity it is clear that this timing may be made shorter, while by making it of metal having low heat conductivity or by positioning the resistance at a greater distance from the bi-metallic element, the timing may be made relatively slow.

In Fig. 12 there is shown another modification of the circuit controller which will give the effect of slow timing. This controller has also been incorporated in a novel device for insertion in a lamp socket. Thus there is provided a relatively flat member 66 having a recess within which is disposed a circuit controller 67. Member 66 may be of insulating material but is preferably of metal to prevent warping. The faces of this member are covered by means of sheets 68 and 69 of insulating material which have flanged edges 71.

The circuit controller is somewhat similar to the unit shown in Figs. 2—5 and includes a flat metal mounting 72 to one end of which is secured the bi-metallic strip 73. Contact 74 is mounted upon the free end of this strip and cooperates with a stationary contact 76, contact 76 being secured to conductor strip 77 which is mounted upon but insulated from mounting 72. Extending laterally from strip 73, there is an integral strip 78 upon which is placed the resistance winding 79. Mounting 72 may be secured to the insulating sheet 69 by means of bolt or rivet 81 which may also serve to mount an outer contact terminal 82. A spacer 83 keeps the operating parts of the controller out of contact with sheet 69. Contact with conductor strip 77 is made by means of a bolt or rivet 84 which serves to mount another external contact terminal 86.

The operation of the above controller is substantially the same as those previously described, the time required for the heat to flow from the extension 78 to the bi-metallic strip causing the period of interruption to be relatively slow. This controller may of course be incorporated in any of the circuits previously described.

In Fig. 14 there is shown an enlarged mounting similar to that shown in Figs. 12 and 13, as a substitute for the mountings shown in Figs. 3 and 5. In this case the flat member 122 is provided with an L-shaped recess 87 within which the bi-metallic strip 128 is adapted to operate. The heating resistance 138 is wound upon an extension 88 which is integral with strip 128.

While the devices for insertion in a lamp socket have all been shown as circular, it is obvious that they may be made in other shapes such as hexagonal, rectangular, or square. The essential thing is that it should be sufficiently large to properly position the external contact terminals and flat enough to permit a lamp base to engage the threaded sleeve of the socket.

As a material for forming the resistance elements shown for the various modifications, it is preferable to employ a resistance wire having a substantial positive temperature coefficient of resistance. For example we propose to employ an insulated wire of iron or nickel which tends to greatly increase its resistance with an increase in temperature. A resistance of this kind permits a relatively large heating current to initially flow thru the resistance when the controller is started in operation, with the result that the first period of flash or interruption, depending upon the circuit employed will not be much longer than the subsequent periods. A resistance of this kind also tends to reduce arcing at the contacts of a shunt connected controller connected as shown in Fig. 6, as when the contacts break, the resistance is cool and has a relatively low value. It will also effect an automatic control of the current flowing thru the resistance when incorporated in any of the controllers shown, thus tending to prevent over-heating due to overloads or a variation in line voltage. In the shunt type of controller such as shown in Figs. 6 and 11, it is preferable to use a relatively high resistance winding, which will be much greater than the resistance of the smallest lamp with which it is intended to be used. Thus a change in the wattage of the lamp will have practically no effect upon the controllers operation since it will always have sufficient current consumption to get the desired heating effect. Furthermore this current consumption is made so low that during the period of interruption, the filament of any size lamp remains practically black.

We claim:

1. A device of the class described comprising a relatively flat member adapted to be removably inserted within a lamp socket or receptacle, contacts exposed upon opposite faces of said member for cooperating with one of the contacts of the socket and one of the contacts of a connection device inserted in the socket, a thermostatic control element mounted upon said member and associated with said terminal contacts, said element including a bi-metallic strip and a pair of contacts controlled by flexing of said strip, a heating resistance, and a metallic heat conducting strip interconnecting the heating resistance and said bi-metallic strip whereby current supplied to the socket will be repeatedly varied at a relatively slow rate.

2. A device adapted to be wholly inserted in a lamp socket comprising an annular ring, insulating members positioned across opposite faces of said ring thereby forming an inner recess, terminal contacts secured to said insulating members, and means disposed within said recess and cooperably associated with said contacts for recurrently varying current supplied by the socket.

3. A circuit controlling device comprising a bi-metallic strip, a support to which one end of the strip is attached, a contact carried by the other end of the strip, a metallic branch extending from said strip and connecting with the strip intermediate the attachment to the support and said contact, and a heating resistance out of direct physical contact with said strip and in thermal contact with said branch.

4. A device of the character described for periodically varying the current in an electric circuit, said device comprising a bimetallic thermoresponsive member and a heating resistance remote from said bimetallic member and thermally connected therewith, said resistance having a decided positive temperature resistance coefficient, the heating of said resistance serving to actuate said bimetallic member to vary the normal condition of said circuit and the cooling of said resistance serving to reestablish the normal condition of said circuit.

In testimony whereof, we have hereto set our hands.

MILTON H. SHOENBERG.
LESTER SCHON.